US011952129B2

(12) United States Patent
Hu et al.

(10) Patent No.: US 11,952,129 B2
(45) Date of Patent: Apr. 9, 2024

(54) CARBON NANOTUBE (CNT) OR CARBON ALLOTROBE BASED INDUCTION HEATING FOR AIRCRAFT ICE PROTECTION

(71) Applicant: GOODRICH CORPORATION, Charlotte, NC (US)

(72) Inventors: Jin Hu, Hudson, OH (US); Galdemir Cezar Botura, Akron, OH (US); Mauro J. Atalla, Charlotte, NC (US)

(73) Assignee: GOODRICH CORPORATION, Charlotte, NC (US)

( * ) Notice: Subject to any disclaimer, the term of this patent is extended or adjusted under 35 U.S.C. 154(b) by 578 days.

(21) Appl. No.: 17/138,453

(22) Filed: Dec. 30, 2020

(65) Prior Publication Data

US 2022/0204169 A1 Jun. 30, 2022

(51) Int. Cl.
| | |
|---|---|
| B32B 9/00 | (2006.01) |
| B64D 15/12 | (2006.01) |
| C01B 32/168 | (2017.01) |
| D02G 3/16 | (2006.01) |
| H01B 1/24 | (2006.01) |
| B82Y 30/00 | (2011.01) |
| B82Y 40/00 | (2011.01) |

(52) U.S. Cl.
CPC ............ B64D 15/12 (2013.01); C01B 32/168 (2017.08); D02G 3/16 (2013.01); H01B 1/24 (2013.01); *B82Y 30/00* (2013.01); *B82Y 40/00* (2013.01); *C01B 2202/22* (2013.01); *C01B 2202/24* (2013.01); *D10B 2101/122* (2013.01); *D10B 2401/16* (2013.01); *D10B 2505/12* (2013.01); *Y10T 428/30* (2015.01)

(58) Field of Classification Search
CPC ....... Y10T 428/30; B82Y 30/00; B82Y 40/00; C01B 32/168; C01B 2202/22; C01B 2202/24; H01B 1/24
USPC .......................................... 428/408; 423/448
See application file for complete search history.

(56) References Cited

U.S. PATENT DOCUMENTS

| | | | |
|---|---|---|---|
| 7,913,952 | B2 | 3/2011 | Boschet et al. |
| 8,664,573 | B2 | 3/2014 | Shah et al. |
| 9,511,871 | B2 | 12/2016 | Steinwandel et al. |
| 10,118,705 | B2 | 11/2018 | Hull et al. |
| 10,155,593 | B2 | 12/2018 | Burton et al. |
| 10,252,806 | B2 | 4/2019 | Lewis et al. |
| 2008/0025164 | A1 | 10/2008 | Boschet et al. |
| 2019/0176994 | A1 | 6/2019 | Brett et al. |

OTHER PUBLICATIONS

European Patent Office; European Search Report dated May 2, 2022 in Application No. 21218197.8.
Induction Application to Aircraft Ice Protection System, Irma Villar, Ana Cardenas, Francisco Redondo, 978-1-7281-0395-2 IEEE.
Cordis EU Research—Article 415548—Horizon 2020 Funded under H2020-EU.3.4.5.4.

*Primary Examiner* — Daniel H Miller
(74) *Attorney, Agent, or Firm* — SNELL & WILMER L.L.P.

(57) ABSTRACT

A system for inductive heating of an aircraft surface includes a conductive outer layer configured to be located on an outer portion of the aircraft surface. The system further includes a carbon nanotube (CNT) yarn configured to receive and conduct electrical current. The system further includes an insulator located between the conductive outer layer and the CNT yarn such that the electrical current flowing through the CNT yarn generates induction heating on the conductive outer layer.

14 Claims, 5 Drawing Sheets

CARBON NANOTUBE (CNT) OR CARBON ALLOTROBE BASED INDUCTION HEATING FOR AIRCRAFT ICE PROTECTION

FIELD

The present disclosure relates to systems and methods for heating aircraft components and surfaces using inductive heating.

BACKGROUND

Various aircraft components (such as an airfoil, nacelle, wing, stabilizers, or the like) may be subjected to relatively cold temperatures (e.g., below freezing) as well as moisture. This combination may result in ice formation on the components. In that regard, it is desirable to reduce any ice that has formed and to reduce the likelihood of ice forming. Various types of heaters have been attempted to reduce or prevent such ice formation.

SUMMARY

Disclosed herein is a system for inductive heating of an aircraft surface. The system includes a conductive outer layer configured to be located on an outer portion of the aircraft surface. The system further includes a carbon nanotube (CNT) yarn or another type of carbon allotrope configured to receive and conduct electrical current. The system further includes an insulator located between the conductive outer layer and the CNT yarn such that the electrical current flowing through the CNT yarn generates induction heating on the conductive outer layer.

In any of the foregoing embodiments, the CNT yarn is wound into a first CNT yarn coil and functions as an inductor.

Any of the foregoing embodiments may further include a second CNT yarn coil located adjacent to the first CNT yarn coil such that the first CNT yarn coil generates induction heating on a first portion of the conductive outer layer and the second CNT yarn coil generates induction heating on a second portion of the conductive outer layer that is different than the first portion.

Any of the foregoing embodiments may further include a second CNT yarn coil that at least partially overlaps the first CNT yarn coil such that a portion of the first CNT yarn coil and a portion of the second CNT yarn coil are aligned with a same portion of the conductive outer layer.

Any of the foregoing embodiments may further include a second CNT yarn coil, wherein the first CNT yarn coil is configured to function as an anti-ice feature and the second CNT yarn coil is located closer to a first outer edge of the aircraft surface and configured to function as a deice feature.

Any of the foregoing embodiments may further include a third CNT yarn coil located closer to a second outer edge of the aircraft surface and configured to function as a second de-ice feature, wherein the first CNT yarn coil is located between the second CNT yarn coil and the third CNT yarn coil.

In any of the foregoing embodiments, the conductive outer layer includes a metal or other material and functions as an erosion shield.

In any of the foregoing embodiments, the conductive outer layer includes a conductive composite material and functions as an erosion shield.

In any of the foregoing embodiments, the conductive composite material includes at least one of a thermoplastic, a Polyether Ether Ketone (PEEK), a carbon fabric, a conductive filler or fabric, fibers, powder, or a CNT.

In any of the foregoing embodiments, the conductive composite material includes at least one of a thermoset, an epoxy, a carbon fabric, or a CNT.

In any of the foregoing embodiments, the insulator includes an adhesive configured to couple the conductive outer layer to the CNT yarn and to insulate the conductive outer layer from the CNT yarn.

In any of the foregoing embodiments, the CNT yarn is removably coupled to the conductive outer layer to facilitate repair or replacement of at least one of the conductive outer layer or the CNT yarn.

In any of the foregoing embodiments, the CNT yarn is bonded with a dielectric polymer.

Also disclosed is an induction-heated aircraft component. The component includes an outer portion. The component further includes a conductive outer layer configured to be located on the outer portion. The component further includes a carbon nanotube (CNT) yarn configured to receive and conduct electrical current. The component further includes an insulator located between the conductive outer layer and the CNT yarn such that the electrical current flowing through the CNT yarn generates induction heating on the conductive outer layer.

In any of the foregoing embodiments, the CNT yarn is wound into a first CNT yarn coil and functions as an inductor.

In any of the foregoing embodiments, the insulator includes an adhesive configured to couple the conductive outer layer to the CNT yarn and to insulate the conductive outer layer from the CNT yarn.

Also disclosed is a method for inductive heating of an aircraft surface. The method includes providing a carbon nanotube (CNT) yarn on the aircraft surface such that the CNT yarn is separated from a conductive outer layer by an insulator. The method further includes providing a first electrical current to the CNT yarn to generate induction heating on the conductive outer layer.

In any of the foregoing embodiments, the CNT yarn is wound into a first CNT yarn coil and functions as an inductor.

Any of the foregoing embodiments may further include providing a second CNT yarn coil separated from the conductive outer layer by the insulator or a second insulator; and providing a second electrical current to the second CNT yarn coil to generate additional inductive heating on the conductive outer layer.

Any of the foregoing embodiments may further include coupling the CNT yarn to the conductive outer layer via the insulator such that the insulator functions as an adhesive.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

The present disclosure describes a system in which carbon nanotube (CNT) yarn is used as an induction conductor. CNT inherently resembles multi-strand litz wires which are suitable for being used at high frequencies without suffering from a skin effect. CNT yarn also has a higher maximum current density than copper wire, resulting in fewer turns than a copper coil, making CNT fabric yarn a more efficient and lower loss inductor than conventional inductors. Furthermore, CNT yarn materials also allow manufacturing of lightweight and strong electrical induction conductors. The density (for example, between 0.5 grams per milliliter (g/ml) and 2.5 g/ml, between 1 g/ml and 2 g/ml, or about 1.5 g/ml) of CNT fiber yarn is about one sixth the density of copper. CNT yarns are conformable and easier to be integrated in to composite ply for different shape of airfoils.

Figure 1:
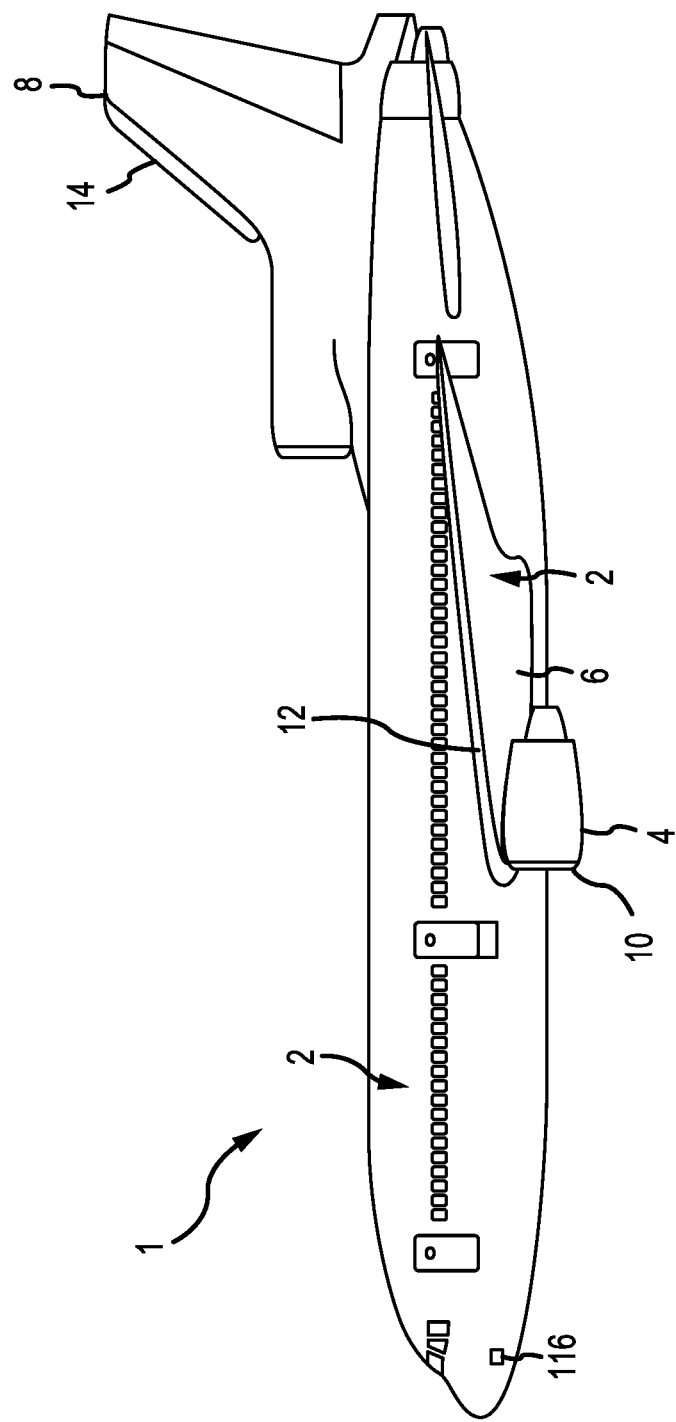
- FIG. 1 illustrates an aircraft including various components, in accordance with various embodiments.

Referring now to FIG. 1, an aircraft 1 is shown. The aircraft 1 may include multiple aircraft components 2 which may be susceptible to ice formation thereon. For example, these aircraft components 2 may include a nacelle 4, a wing 6, a tail wing 8, or the like. A system 10 for inductive deicing or anti-icing features using CNT yarn may be located on areas of the aircraft components 2 that are most susceptible to ice formation (e.g., leading edges of the components 2). For example, a system 10 may be located on a leading edge of the nacelle 4, a system 12 may be located on a leading edge of the wing 6, and a system 14 may be located on a leading edge of the tail wing 8.

Figure 2:
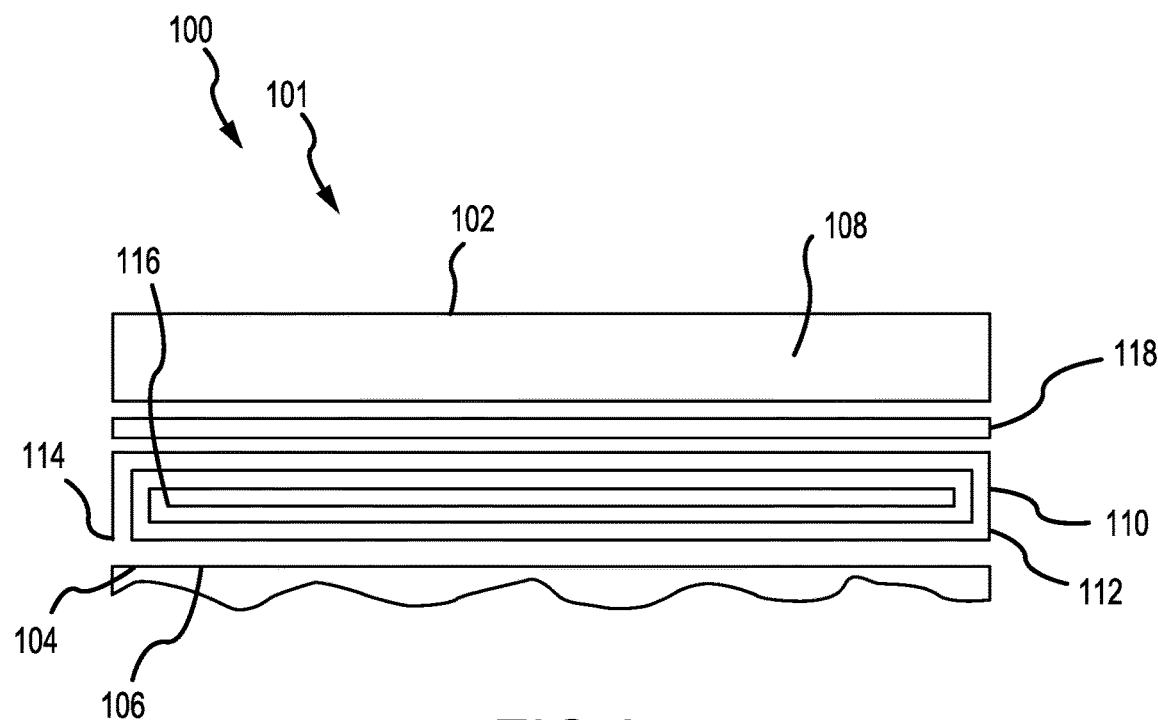
FIG. 2 illustrates a system for providing inductive heating of an aircraft component, in accordance with various embodiments.

Referring now to FIG. 2, an exemplary system 100 for inductive heating of an aircraft surface (e.g., the nacelle 4, wing 6, tail wing 8, or the like) is shown. The system 100 may be used as any of the systems 10, 12, 14. The system 100 may be incorporated into, or installed onto, an aircraft component 102, such as at a leading edge 102 of the aircraft component 102. The aircraft component 102 may include an aircraft surface 104 which may include an outer portion 106. The system 100 may be installed on the outer portion 106 of the aircraft surface 104.

The system 100 may include a conductive outer layer 108. The conductive outer layer 108 may be conductive and may further function as an erosion shield. In that regard, the conductive outer layer 108 may include a metal (e.g., aluminum, titanium, stainless steel or the like), or a composite material (e.g., a thermoplastic, for example, Polyether Ether Ketone (PEEK), or thermoset such as epoxy, a carbon fabric or fibers or powders, or a CNT fabric or powders; e.g., the composite material may include PEEK or epoxy with CNT or another conductor integrated therein). In various embodiments, the conductive outer layer 108 may further function as a lightning strike layer to reduce the likelihood or effect of a lightning strike. In that regard, the conductive outer layer 108 may provide a conductive path to a ground so any lightning strike may follow the conductive path towards ground rather than flowing through and damaging non-conductive components.

The system 100 may further include a CNT yarn 110. In various embodiments, the CNT yarn 110 may be wound or otherwise formed into a CNT yarn coil 112. As used herein, a CNT yarn coil may include any flat or three-dimensional coil that includes CNT yarn. For example, a CNT yarn coil may include flat turns, a traditional coil shape, or the like. As referenced above, the CNT yarn 110 may be conductive. The CNT yarn coil 112 may include a first terminal 114 and a second terminal 116. Electrical current may flow from the first terminal 114 to the second terminal 116 (or vice versa) to generate an electric field from the CNT yarn coil 112, causing the CNT yarn coil 112 to operate as an inductor. In various embodiments, the CNT yarn 110 may be coated and/or bonded with a dielectric polymer.

The system 100 may also include an insulator 118. The insulator 118 may be located between the CNT yarn 110 and the conductive outer layer 108, electrically isolating the CNT yarn 110 from the conductive outer layer 108. In that regard and in response to current flowing through the CNT yarn coil 112, current may be applied to the conductive outer layer 108 via induction from the CNT yarn coil 112. In various embodiments, the insulator 118 may be an adhesive capable of removably or permanently coupling the CNT yarn 110 to the conductive outer layer 108. For example, the insulator 118 may include one or more of a thermoset (e.g., epoxy), thermoplastic (e.g., PEEK), glass fiber, fabric reinforced dielectric composite plies. In various embodiments, two or more of the conductive outer layer 108, the insulator 118, and the CNT yarn 118 may be removably coupled together using a method other than an adhesive. This may provide additional ability to remove one or more of the components from the system 100 for replacement or repair.

In various embodiments, the CNT yarn 118 may be removably coupled to the aircraft surface 104 or may be permanently coupled to the aircraft surface 104. For example, the coupling may be via epoxy, fasteners, or the like.

Figure 3:
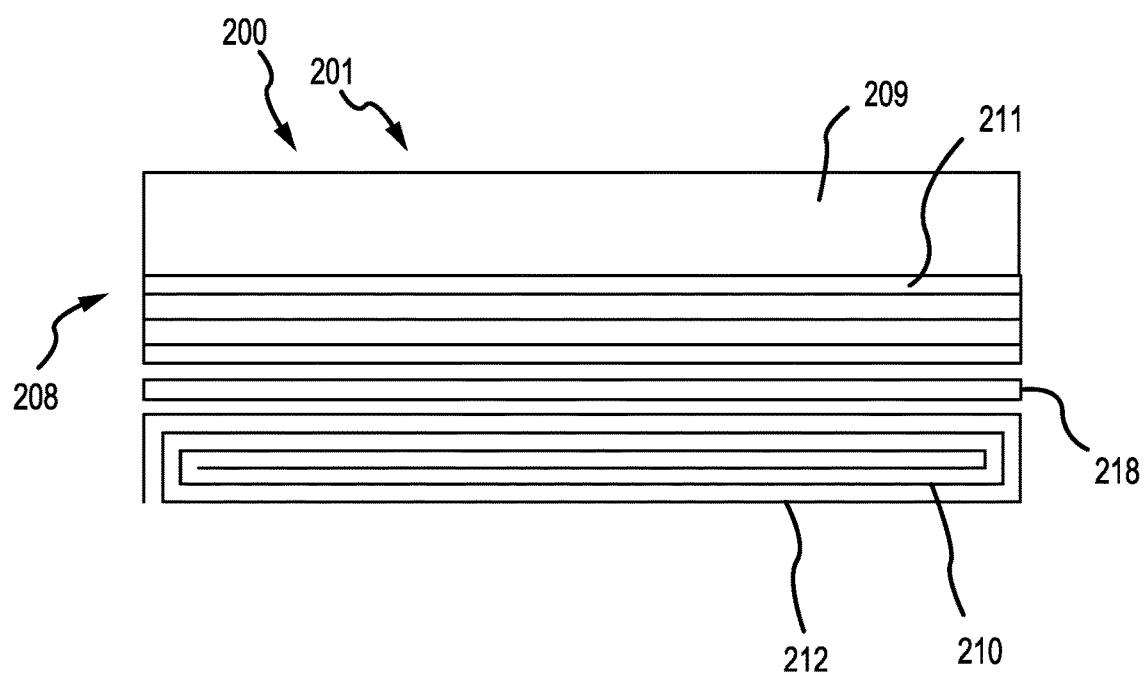
FIG. 3 illustrates a system for providing inductive heating of an aircraft component, in accordance with various embodiments.

Referring now to FIG. 3, another system 200 may have similar features as the system 100 of FIG. 1. In particular, the system 200 may be included in, or added to, an aircraft component 201. The system 200 may include a CNT yarn 210 formed into a CNT yarn coil 212. The CNT yarn coil 212 may be similar to the CNT yarn coil 112 of FIG. 1. The system 200 may further include an insulator 218. The insulator may include similar features as the insulator 118 of FIG. 1. The system 200 may further include a conductive outer layer 208. However, the conductive outer layer 208 may include more than one plies. For example, the conductive outer layer 208 may include a first ply 209 and a second ply 211. The first ply 209 and second ply 211 may be coupled together using any known technique. In addition, the plies 209, 211 may include the same or different material. Use of more than one plies 209, 211 may provide the benefit of improved erosion protection.

Figure 4A:
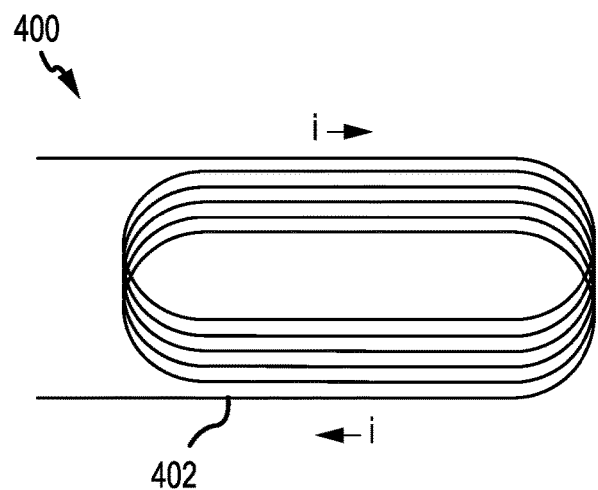
FIG. 4A illustrates an exemplary carbon nanotube (CNT) yarn, in accordance with various embodiments.

Referring now to FIG. 4A, an exemplary CNT yarn coil 402 is formed from a CNT yarn 400. As shown, the CNT yarn coil 402 may be a single, standalone coil.

Figure 4B:
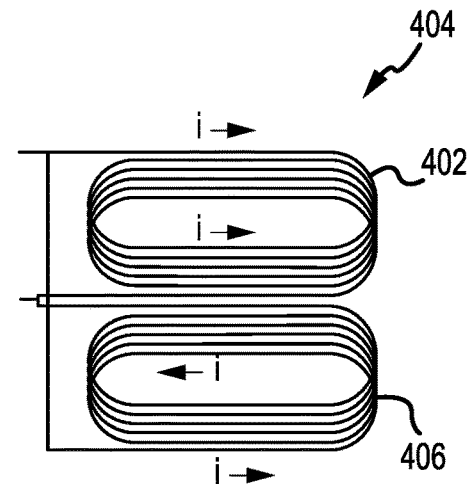
FIG. 4B illustrates multiple exemplary CNT yarns, in accordance with various embodiments.

Referring to FIG. 4B, a system 400 may include multiple coils. In particular, the system 400 may include the first CNT yarn coil 402 and a second CNT yarn coil 406 located adjacent to the first CNT yarn coil 402. In that regard, the coils 402, 406 may receive electrical power from a single power source or multiple power sources. The coils 402, 406 may be spaced apart to provide inductive heating to separate areas on an conductive outer layer. In various embodiments, the coils 402, 406 may be interleaved in any pattern.

Figure 5A:
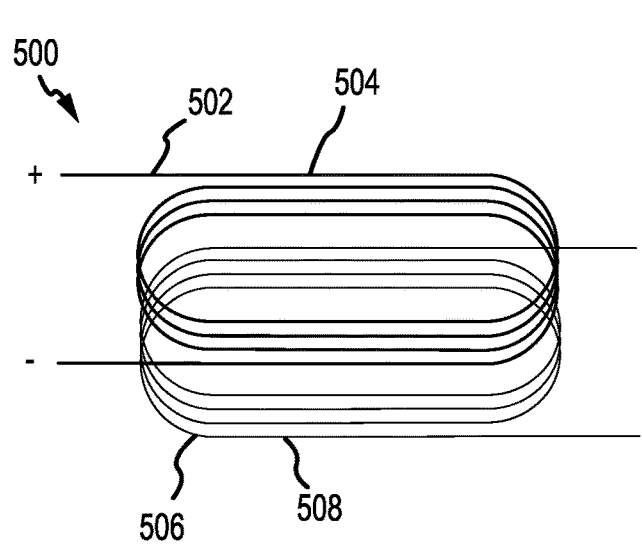
FIG. 5A illustrates a two-phase CNT yarn coil design, in accordance with various embodiments.

Turning to FIG. 5A, a two-phase CNT yarn coil design 500 is shown. As shown, the design 500 may include a first CNT yarn 502 that forms a first CNT yarn coil 504, and a second CNT yarn 506 that forms a second CNT yarn coil 508. As shown, the first coil 504 may be stacked on the second coil 508 (or vice versa). Current provided to the first coil 504 may be out-of-phase with the current provided to the second coil 508. This design may provide improved distribution of induction heating relative to single-phase designs. In various embodiments, the first coil 504 and the second coil 508 may be interleaved with each other (and electrically isolated) to provide a two-phase design. In various embodiments, any quantity of coils may be stacked or interleaved to provide any quantity of phases.

Figure 5B:
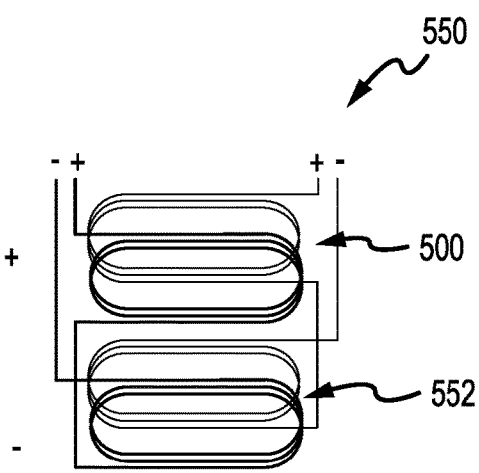
FIG. 5B illustrates a system using multiple two-phase CNT yarn coil designs, in accordance with various embodiments.

Turning now to FIG. 5B, a two-phase coil system 550 is shown. As shown, the system 550 includes the two-phase CNT yarn coil design 500 and a second (potentially identical) two-phase CNT yarn coil design 552 located adjacent to the first two-phase CNT yarn coil design 500. This provides two-phase inductive heating over a greater surface area, thus heating a greater area of a conductive outer surface.

Figure 6:
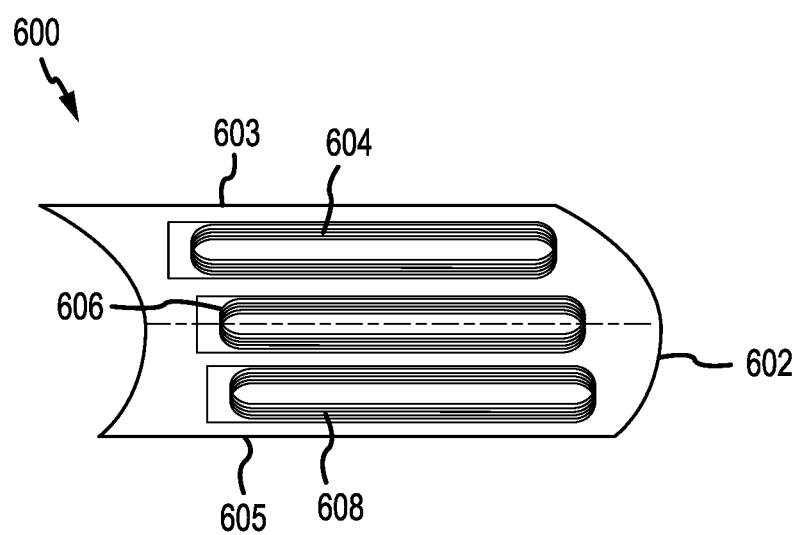
FIG. 6 illustrates an airfoil using CNT yarn coil designs to provide deicing and anti-icing functions, in accordance with various embodiments.

Turning to FIG. 6, a CNT yarn coil may be used to provide anti-ice features or deice features. As shown, an aircraft component 600 includes a leading edge 602, a first outer surface 603, and a second outer surface 605. A first CNT yarn coil 604 may be located proximate to the first outer surface 603 and may provide deicing capabilities. A third CNT yarn coil 608 may be located proximate to the second outer surface 605 and may also provide deicing capabilities. A second CNT yarn coil 606 may be located between the first outer surface 603 and the second outer surface 605 (and between the first CNT yarn coil 604 and the third CNT yarn coil 608) and may provide anti-icing capabilities.

Figure 7:
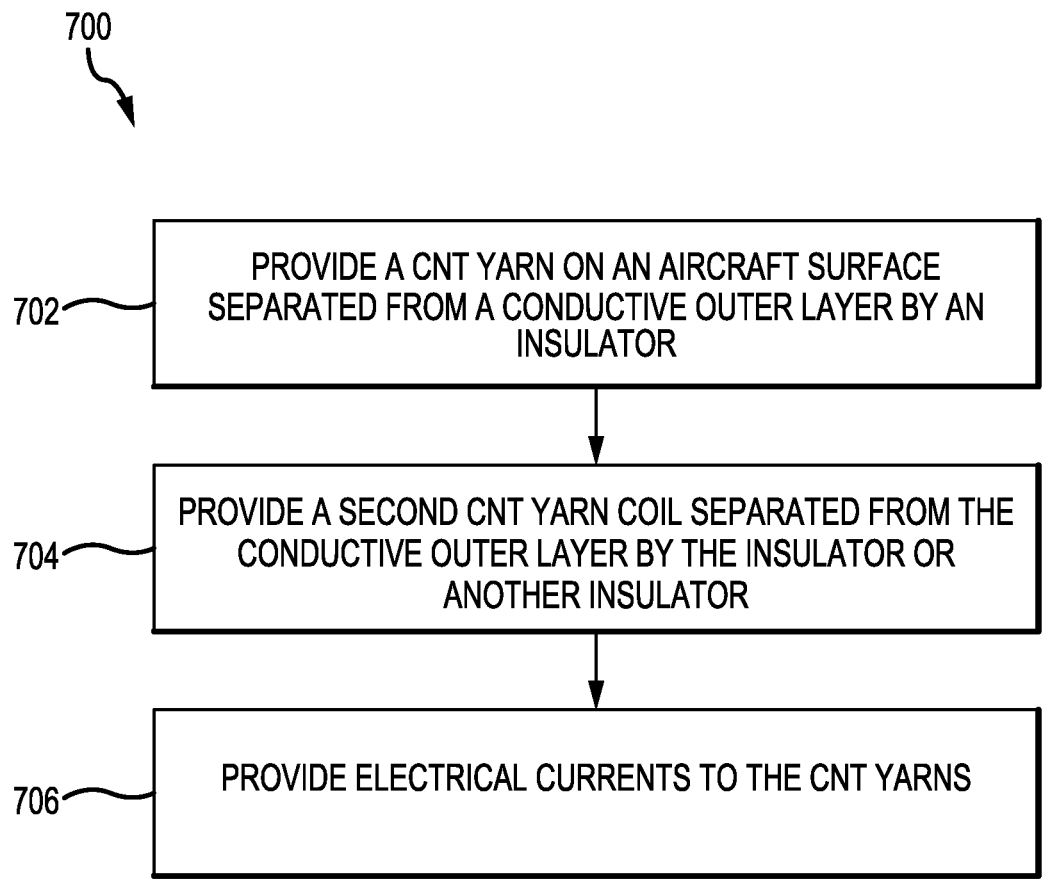
FIG. 7 is a flowchart illustrating a method for providing inductive heating of an aircraft component, in accordance with various embodiments.

Referring now to FIG. 7, a method 700 for inductive heating of an aircraft surface is shown. In block 702, a CNT yarn, such as a CNT yarn coil, is provided on an aircraft surface. An insulator may be positioned on the CNT yarn coil on a surface opposite the aircraft surface. A conductive outer layer may be positioned on the insulator. In that regard, the insulator may be located between the conductive outer layer and the CNT yarn coil.

In block 704, a second CNT yarn coil may be provided, e.g., on the aircraft surface or on the first CNT yarn coil. A second insulator or the first insulator may be positioned on the CNT yarn coil. The conductive outer layer may be in contact with the first or second insulator such that the insulator separates the conductive outer layer from the CNT yarn coil(s).

In block 706, electrical current may be provided to the CNT yarn coils. The electrical current may create an electric field around the CNT yarn coils, thus generating inductive heating on the conductive outer layer.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 12(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for inductive heating of an aircraft surface, the system comprising:
   a conductive outer layer configured to be located on an outer portion of the aircraft surface;
   a first carbon nanotube (CNT) yarn configured to receive and conduct electrical current, wherein the first CNT yarn is wound into a first CNT yarn coil and functions as a first inductor;
   a second CNT yarn configured to receive and conduct electrical current, wherein the second CNT yarn is wound into a second CNT yarn coil and functions as a second inductor and wherein the second CNT yarn coil at least partially overlaps the first CNT yarn coil such that a portion of the first CNT yarn coil and a portion of the second CNT yarn coil are aligned with a same portion of the conductive outer layer; and
   an insulator located between the conductive outer layer and the first CNT yarn coil and the second CNT yarn coil such that the electrical current flowing through the first CNT yarn coil and the second CNT yarn coil generates induction heating on the conductive outer layer.

2. The system of claim 1, wherein the first CNT yarn coil is configured to function as an anti-ice feature and the second CNT yarn coil is located closer to a first outer edge of the aircraft surface and configured to function as a deice feature.

3. The system of claim 2, further comprising a third CNT yarn coil located closer to a second outer edge of the aircraft surface and configured to function as a second de-ice feature, wherein the first CNT yarn coil is located between the second CNT yarn coil and the third CNT yarn coil.

4. The system of claim 1, wherein the conductive outer layer includes a metal or other material and functions as an erosion shield.

5. The system of claim 1, wherein the conductive outer layer includes a conductive composite material and functions as an erosion shield.

6. The system of claim 5, wherein the conductive composite material includes at least one of a thermoplastic, a Polyether ether ketone (PEEK), a carbon fabric, or a CNT.

7. The system of claim 5, wherein the conductive composite material includes at least one of a thermoset, an epoxy, a carbon fabric, or a CNT.

8. The system of claim 1, wherein the insulator includes an adhesive configured to couple the conductive outer layer to the CNT yarn and to insulate the conductive outer layer from the CNT yarn.

9. The system of claim 1, wherein the CNT yarn is removably coupled to the conductive outer layer to facilitate repair or replacement of at least one of the conductive outer layer or the CNT yarn.

10. The system of claim 1, wherein the CNT yarn is bonded with a dielectric polymer.

11. An induction-heated aircraft component, comprising:
    an outer portion;
    a conductive outer layer configured to be located on the outer portion;
    a first carbon nanotube (CNT) yarn configured to receive and conduct electrical current, wherein the first CNT yarn is wound into a first CNT yarn coil and functions as a first inductor;
    a second CNT yarn configured to receive and conduct electrical current, wherein the second CNT yarn is wound into a second CNT yarn coil and functions as a second inductor and wherein the second CNT yarn coil at least partially overlaps the first CNT yarn coil such that a portion of the first CNT yarn coil and a portion of the second CNT yarn coil are aligned with a same portion of the conductive outer layer; and
    an insulator located between the conductive outer layer and the first CNT yarn coil and the second CNT yarn coil such that the electrical current flowing through the first CNT yarn coil and the second CNT yarn coil generates induction heating on the conductive outer layer.

12. The induction-heated aircraft component of claim 11, wherein the insulator includes an adhesive configured to couple the conductive outer layer to the CNT yarn and to insulate the conductive outer layer from the CNT yarn.

13. A method for inductive heating of an aircraft surface, the method comprising:
    providing a first carbon nanotube (CNT) yarn on an inside of the aircraft surface such that the first CNT yarn is separated from a conductive outer layer of the aircraft surface by an insulator, wherein the first CNT yarn is wound into a first CNT yarn coil and functions as a first inductor;
    providing a second CNT yarn on the inside of the aircraft surface such that the second CNT yarn is separated from the conductive outer layer of the aircraft surface by the insulator, wherein the second CNT yarn is wound into a second CNT yarn coil and functions as a second inductor and wherein the second CNT yarn coil at least partially overlaps the first CNT yarn coil such that a portion of the first CNT yarn coil and a portion of the second CNT yarn coil are aligned with a same portion of the conductive outer layer;
    providing a first electrical current to the first CNT yarn coil to generate induction heating on the conductive outer layer; and
    providing a second electrical current to the second CNT yarn coil to generate additional inductive heating on the conductive outer layer.

14. The method of claim 13, further comprising coupling the CNT yarn to the conductive outer layer via the insulator such that the insulator functions as an adhesive.

* * * * *